J. H. DALE.
PIANO STOOL.
APPLICATION FILED AUG. 24, 1910.
1,019,768. Patented Mar. 12, 1912.
2 SHEETS—SHEET 1.
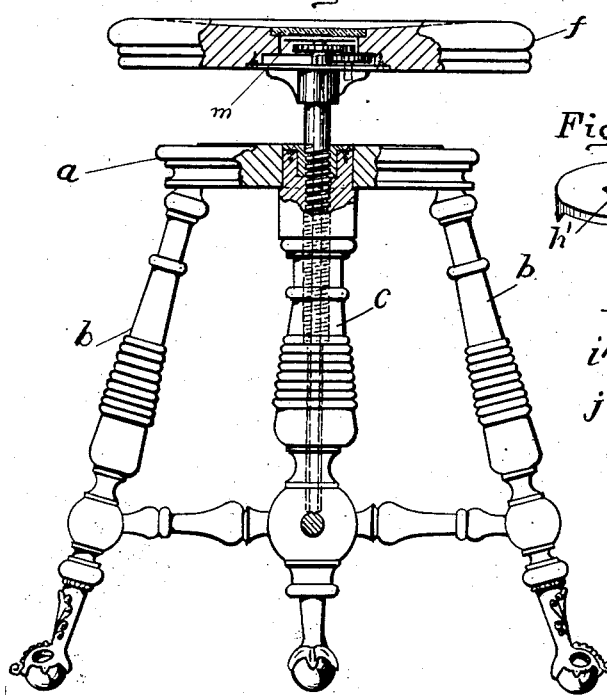
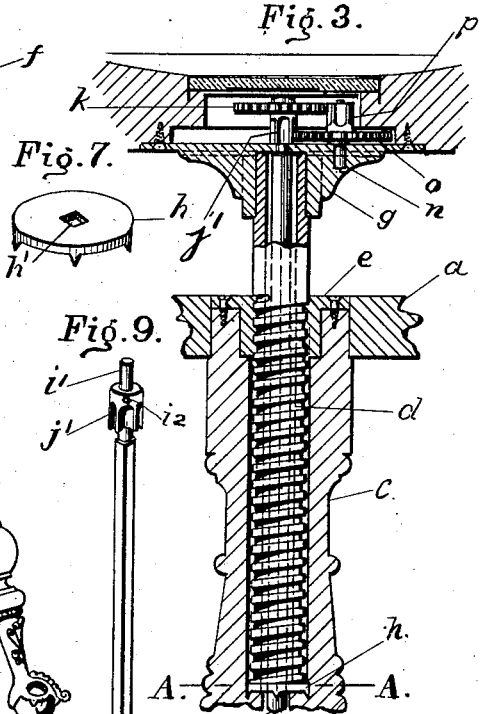
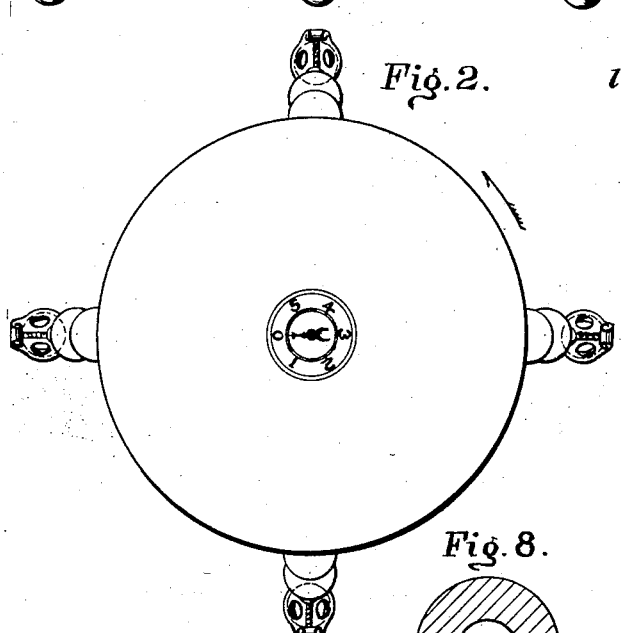
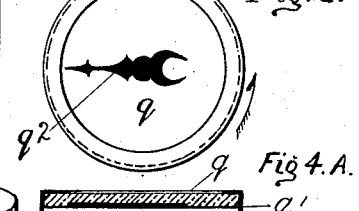
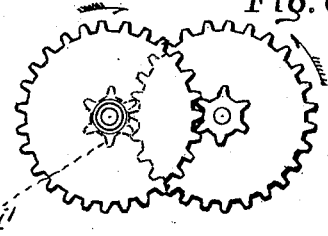
Witnesses:
L. F. Browning
H. C. Davidson
John H. Dale Inventor
By his Attorney
Edward C. Davidson J. H. DALE.
PIANO STOOL.
APPLICATION FILED AUG. 24, 1910.
1,019,768.
Patented Mar. 12, 1912.
2 SHEETS—SHEET 2.
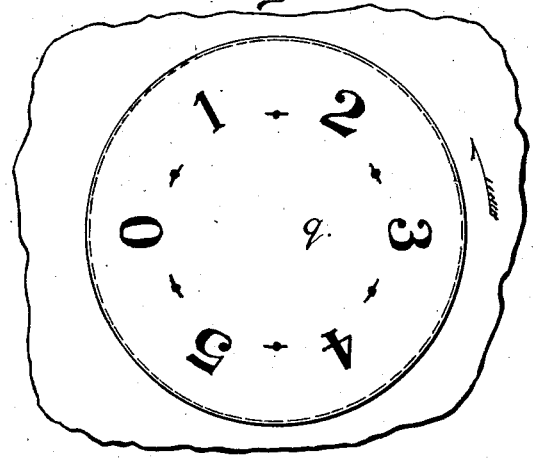
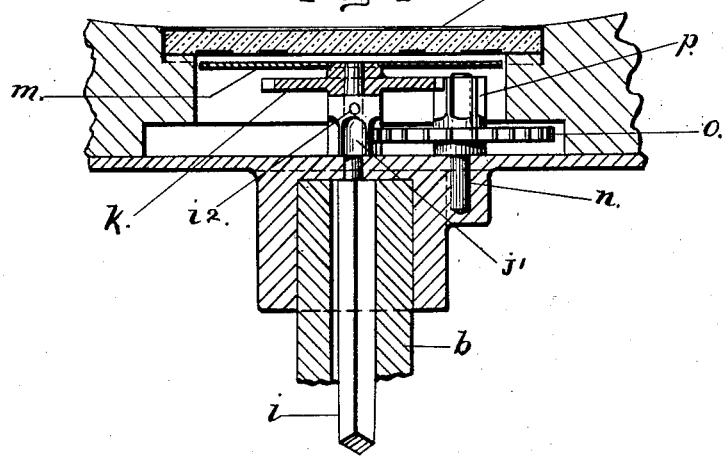

UNITED STATES PATENT OFFICE.

JOHN H. DALE, OF NEWARK, NEW JERSEY.

PIANO-STOOL.

1,019,768.  Specification of Letters Patent.  Patented Mar. 12, 1912.

Application filed August 24, 1910. Serial No. 578,743.

*To all whom it may concern:*

Be it known that I, JOHN H. DALE, a citizen of the United States of America, residing in Newark, county of Essex, State of New Jersey, have invented a certain new and useful Improvement in Piano-Stools, of which the following is a specification.

This invention comprises a new organization wherein devices indicating the height at which the stool is adjusted are set in the seat where they may be conveniently observed by the user.

The stool comprises the usual threaded part carrying the seat and by the rotation of the seat, the scale or indicating devices are actuated to show the height at which the surface of the seat stands.

The details of construction are hereinafter set forth.

In the accompanying drawings: Figure 1 is a side elevation partly in section and with the front leg of the stool removed: Fig. 2, a plan view: Fig. 3, a vertical longitudinal section: Fig. 4, a detached plan view of a glass plate seated in the face of the stool: Fig. 4ª, a cross section therewith: Fig. 5, a detail view of an indicator or scale plate that is to be located beneath the glass plate and turn with reference thereto as the seat of the stool is revolved: Fig. 6, a plan view showing the gearing by which the plate shown in Fig. 5 is revolved: Fig. 7, a detail perspective view of a plate having a central squared aperture and which is to be seated at the bottom of the screw cavity of the center part of the stool: Fig. 8 is a cross section on line A, A, of Fig. 3. Fig. 9 is a perspective view of the square center rod that is located in the hollow screw of the stool: Fig. 10, a plan view of the central part of the stool seat showing a modification in that the indicating or scale marks or numbers are upon the glass plate: Fig. 11, a detail perspective view of the coöperating disk located and turning beneath the glass plate and, in this instance, carrying the pointer or index finger; and Fig. 12, a vertical central section through a stool constructed in accordance with the arrangement of Figs. 10 and 11.

The stool has the usual head $a$, legs $b$ and center posts $c$ bored out to receive the screw shaft $d$, the thread of which fits and turns in a nut $e$ at the top of the post flush with the surface of the head $a$. The seat $f$ has a bottom plate $g$ to which the upper end of the screw shaft is rigidly secured and the seat may be turned to be run up or down as is usual in all piano stools. At the bottom of the socket in the posts $c$ within which the screw shaft works, there is seated a metal plate $h$ having spurs at its edges that are driven into the bottom wall of the cavity to prevent the plate from turning and, in the center of this plate, is a square hole $h'$ through which passes the correspondingly shaped rod $i$ that extends through and beyond plate $h$ into a bore provided for it in the lower part of the center post. At the upper end of this squared rod is a cylindrical portion $i'$ upon which a pinion $j'$ is secured by a pin $i^2$. Turning loosely on the part $i'$ above the pinion $j'$ is a gear $k$ whose upper face has a central hub upon which is secured the rotatable dial plate $m$ (Figs. 1 and 12).

The bottom plate $g$ of the seat has a socket that serves as a bearing for a vertical stud shaft $n$ and which has secured to it a gear $o$ that meshes with the pinion $j'$ on the rod $i'$ and above and rigid with the gear a pinion $p$ that meshes with the gear $k$ that revolves loosely on the end of the shaft $i'$ and carries the index plate $m$. These parts are all seated in a central opening formed through the seat and closed by a counter-sunk glass plate $q$, shown in detail in Figs. 4 and 4ª. The glass plate $q$ is circular and is surrounded by a flanged metal ring $q'$ that fits in the opening in the seat. On the under side of the glass plate, in the organization shown on Sheet 1 of the drawings, there is an index finger or pointer $q^2$. This may be painted in some dark color on the under face of the plate, or be countersunk in the face of the plate and filled with some appropriate dark material. It will be obvious that as the seat is revolved, gear $o$ will revolve around the stationary pinion $j'$ and that pinion $p$ will turn the gear $k$ which in turn will carry around the scale or index plate $m$ attached to it. The pitch of the screw $d$ and the gears and pinions being properly apportioned, the figures 1, 2, 3, 4, 5, indicated on the scale plate may be taken to be inches and therefore the stool seat may, from its lowermost position, be raised from a fraction of one inch to a maximum of something less than six inches. The scale indication of the height of the surface of the seat may be readily read on a casual glance. It is thought that a stool of this character will afford a desirable convenience to pianists each of whom will, of course, know the most comfortable elevation for him.

The only difference in the arrangement shown in Figs. 10, 11, 12, is that the scale or indicating numbers are placed upon the glass plate $q$ and the index finger or pointer upon the rotatable disk $m$.

The screw $b$ may be a right hand screw with four threads to the inch so that it will require four turns of the seat to raise or lower it one inch. The squared rod $i$ must be of such length as sot to pass out of engagement with the disk $h$ when the stool seat is at its highest elevation.

I claim:

1. A piano stool comprising a seat having an opening, a center post, a screw shaft attached to the seat and working in a cavity in the center post, a shaft also carried by the seat passing centrally through the screw shaft and held against turning, gear devices turning on the upper end of the shaft within the opening in the seat, coöperating gear devices carried by the seat and also located in said opening, indicator devices operated by said gear devices and a transparent plate closing the opening in the seat and through which the indicator devices may be observed.

2. A piano stool comprising a seat having an opening, a screw shaft attached thereto, a shaft also attached thereto and located inside the screw shaft and of greater length than the latter, a center post having a cavity within which the screw shaft works, a nonrotatable plate located at the bottom of the cavity having in it an opening through which the shaft moves and that holds it against turning, a pinion fixed on the upper end of the shaft within the opening in the seat, a gear turning upon the end of the shaft above said pinion and carrying an indicator device, a coöperating gear meshing with said pinion and carried on a shaft having a bearing in the seat, a pinion turning with the last named gear and meshing with the first named gear and a transparent plate closing the opening in the seat and having indicator devices thereon.

In testimony whereof, I have hereunto subscribed my name.

JOHN H. DALE.

Witnesses:
 CHAS. H. RITER,
 CHAS. L. FIALA.

---

Copies of this patent may be obtained for five cents each, by addressing the "Commissioner of Patents, Washington, D. C."